United States Patent
Li et al.

(10) Patent No.: US 11,888,110 B2
(45) Date of Patent: Jan. 30, 2024

(54) ALL SOLID STATE BATTERY AND ANODE

(71) Applicant: TOYOTA JIDOSHA KABUSHIKI KAISHA, Toyota (JP)

(72) Inventors: Ximeng Li, Susono (JP); Masafumi Nose, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 16/042,187

(22) Filed: Jul. 23, 2018

(65) Prior Publication Data
US 2019/0051925 A1 Feb. 14, 2019

(30) Foreign Application Priority Data
Aug. 10, 2017 (JP) ................. 2017-155221

(51) Int. Cl.
*H01M 10/0562* (2010.01)
*H01M 4/38* (2006.01)
*H01M 10/42* (2006.01)
*H01M 10/052* (2010.01)

(52) U.S. Cl.
CPC ....... *H01M 10/0562* (2013.01); *H01M 4/382* (2013.01); *H01M 10/052* (2013.01); *H01M 10/4235* (2013.01); *H01M 2300/0068* (2013.01)

(58) Field of Classification Search
CPC .. H01M 10/0562; H01M 4/628; H01M 4/665; H01M 4/668; H01M 4/80; H01M 2/14; H01M 2/16; H01M 2/1673
See application file for complete search history.

(56) References Cited

U.S. PATENT DOCUMENTS

2011/0305948 A1* 12/2011 Miyatake ............ H01M 4/668
  429/210
2015/0064569 A1* 3/2015 Kato ................. H01M 10/0525
  429/235

(Continued)

FOREIGN PATENT DOCUMENTS

CN 104221195 A 12/2014
CN 105845891 A 8/2016
(Continued)

OTHER PUBLICATIONS

JP-2017084515-A English machine translation (Year: 2020).*
(Continued)

*Primary Examiner* — Ula C Ruddock
*Assistant Examiner* — Armindo Carvalho, Jr.
(74) *Attorney, Agent, or Firm* — Oliff PLC

(57) ABSTRACT

A main object of the present disclosure is to provide an all solid state battery in which the reversibility of the deposition and dissolution reaction of a metal Li can be improved while inhibiting an occurrence of short circuit. The above object is achieved by providing an all solid state battery utilizing a deposition and dissolution reaction of a metal Li as an anode reaction, the all solid state battery comprising: an anode current collector, a porous layer comprising a resin, a solid electrolyte layer, a cathode active material layer, and a cathode current collector, in this order; wherein an electric resistance of the porous layer is 1Ω or more and 690Ω or less; and a thickness of the porous layer is 14 μm or less.

16 Claims, 3 Drawing Sheets

(56) References Cited

U.S. PATENT DOCUMENTS

| | | | | |
|---|---|---|---|---|
| 2016/0028114 A1* | 1/2016 | Pratt | ............... | H01B 1/122 |
| | | | | 429/309 |
| 2016/0240831 A1* | 8/2016 | Zeng | ............ | H01M 2/1686 |
| 2017/0207440 A1 | 7/2017 | Hama et al. | | |
| 2017/0222280 A1* | 8/2017 | Asano | ............ | H01M 10/4235 |
| 2019/0051933 A1* | 2/2019 | Li | ............ | H01M 4/133 |

FOREIGN PATENT DOCUMENTS

| | | | |
|---|---|---|---|
| JP | H10-302794 | A | 11/1998 |
| JP | 2013-073846 | A | 4/2013 |
| JP | 2016-100088 | A | 5/2016 |
| JP | 2017-084515 | A | 5/2017 |
| JP | 2017084515 | A * | 5/2017 |
| JP | 2017-130283 | A | 7/2017 |
| JP | 2019-033053 | A | 2/2019 |
| WO | 2013/151046 | A1 | 10/2013 |

OTHER PUBLICATIONS

Li, Yutao et al. "Hybrid Polymer/Garnet Electrolyte with a Small Interfacial Resistance for Lithium-Ion Batteries". Angewandte Chemie International Edition, vol. 56, No. 3, pp. 753-756, 2017.
Zhou, Weidong et al. "Plating a Dendrite-Free Lithium Anode with a Polymer/Ceramic/Polymer Sandwich Electrolyte". Journal of the American Chemical Society, vol. 138, No. 30, pp. 9385-9388, 2016.
U.S. Appl. No. 16/055,303, filed Aug. 6, 2018, in the name of Ximeng Li et al.

* cited by examiner

Discharge ↑ ↓ Charge

ALL SOLID STATE BATTERY AND ANODE

TECHNICAL FIELD

The present disclosure relates to an all solid state battery, and an anode used therein.

BACKGROUND ART

An all solid state battery is a battery comprising a solid electrolyte layer between a cathode active material layer and an anode active material layer. Patent Literature 1 discloses a lithium secondary battery wherein an electrolyte is interposed between a cathode electrode and an anode; the anode includes an anode active material consisting of a mixture of metallic lithium and carbon black; and the electrolyte includes a lithium ion conducting inorganic solid electrolyte. The object of this technique is to provide a lithium secondary battery which enables the reduction in influence of dendrite.

Patent Literature 2 discloses a lithium secondary battery comprising: a first electrode that possesses a lithium ion conducting electrolyte, a cathode electrode and an anode which touch the electrolyte; precipitation and lytic reaction of metal lithium occur at the time of charge and discharge in the anode electrode; and a second electrode which prevents precipitation of the shape of a dendrite of metal lithium. This technique solves the problem of the dendrite and the object thereof is to provide a lithium secondary battery which can attain high energy density, using dissolution/precipitation reaction of metal lithium as electrochemical reaction in an anode.

CITATION LIST

Patent Literatures

Patent Literature 1: Japanese Patent Application Publication (JP-A) No. 2016-100088
Patent Literature 2: JP-A No. H10-302794

SUMMARY OF DISCLOSURE

Technical Problem

The batteries described in Patent Literatures 1 and 2 utilize a deposition and dissolution reaction of a metal Li as an anode reaction. It is important to inhibit the occurrence of short circuit due to dendrite when the deposition and dissolution reaction of a metal Li is utilized. Meanwhile, as described later, the reversibility of the deposition and dissolution reaction of a metal Li may be degraded in some cases by just trying to inhibit the occurrence of short circuit.

The present disclosure has been made in view of the above circumstances, and a main object thereof is to provide an all solid state battery in which the reversibility of the deposition and dissolution reaction of a metal Li can be improved while inhibiting an occurrence of short circuit.

Solution to Problem

In order to solve the problem, the present disclosure provides an all solid state battery utilizing a deposition and dissolution reaction of a metal Li as an anode reaction, the all solid state battery comprising: an anode current collector, a porous layer comprising a resin, a solid electrolyte layer, a cathode active material layer, and a cathode current collector, in this order; an electric resistance of the porous layer is 1Ω or more and 690Ω or less; and a thickness of the porous layer is 14 μm or less.

According to the present disclosure, arrangement of a specific porous layer allows an all solid state battery to have high reversibility of deposition and dissolution reaction of a metal Li while inhibiting an occurrence of short circuit.

In the disclosure, the resin may be a fluorine-based resin.
In the disclosure, the fluorine-based resin may be polyvinylidene fluoride (PVDF).
In the disclosure, a content of the resin in the porous layer may be 25 weight % or more; and the thickness of the porous layer may be 4 μm or less.
In the disclosure, the electric resistance of the porous layer may be 153Ω or less.
In the disclosure, the porous layer may contain an electron conductive material.
In the disclosure, the porous layer may contain just the resin.

Also, the present disclosure provides an anode to be used in an all solid state battery utilizing a deposition and dissolution reaction of a metal Li as an anode reaction, the anode comprising: an anode current collector and a porous layer comprising a resin in this order; an electric resistance of the porous layer is 1Ω or more and 690Ω or less; and a thickness of the porous layer is 14 μm or less.

According to the present disclosure, arrangement of a specific porous layer allows an anode to have high reversibility of deposition and dissolution reaction of a metal Li while inhibiting an occurrence of short circuit.

Advantageous Effects of Disclosure

The all solid state battery of the present disclosure exhibits effects that the reversibility of the deposition and dissolution reaction of a metal Li can be improved while inhibiting an occurrence of short circuit.

DESCRIPTION OF EMBODIMENTS

The all solid state battery and the anode of the present disclosure are hereinafter described in detail.

A. All Solid State Battery

Figure 1A:
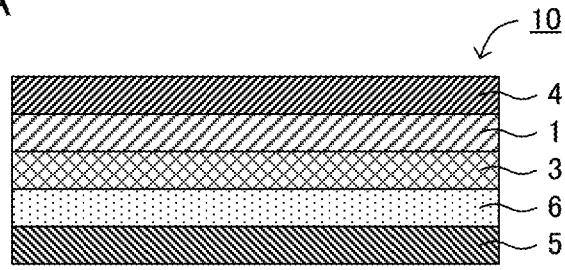
FIGS. 1A and 1B are schematic cross-sectional views illustrating an example of the all solid state battery of the present disclosure.
Figure 1B:
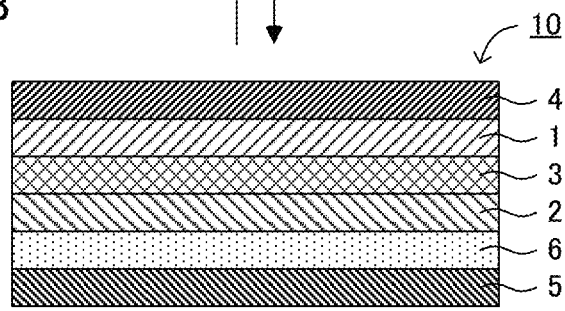

FIGS. 1A and 1B are schematic cross-sectional views illustrating an example of the all solid state battery of the present disclosure. All solid state battery 10 illustrated in FIG. 1A has anode current collector 5, porous layer 6 comprising a resin, solid electrolyte layer 3, cathode active material layer 1, and cathode current collector 4, in this order. Incidentally, in the present disclosure, anode current collector 5 and porous layer 6 may be referred to as an anode in some cases. Similarly, cathode active material layer 1 and cathode current collector 4 may be referred to as a cathode in some cases. Also, all solid state battery 10 is a battery utilizing a deposition and dissolution reaction of a metal Li as an anode reaction, and an advantage thereof is high energy density. Also, as shown in FIG. 1B, in all solid battery 10, anode active material layer 2 that is the deposition Li is generated between solid electrolyte layer 3 and porous layer 6 by charging the battery.

According to the present disclosure, arrangement of a specific porous layer allows an all solid state battery to have high reversibility of deposition and dissolution reaction of a metal Li while inhibiting an occurrence of short circuit. As described above, it is important to inhibit the occurrence of short circuit (internal short circuit) due to dendrite in the case of the all solid state battery utilizing the deposition and dissolution reaction of a metal Li. Meanwhile, the level of short circuit varies: from a rough short circuit in the level the potential difference between the cathode and the anode vanishes, to a short circuit in the level the voltage decreases while the potential difference between the cathode and the anode is maintained. The latter case may be expressed as a minute short circuit. The minute short circuit may be a problem especially upon a rapid charge.

Figure 2A:
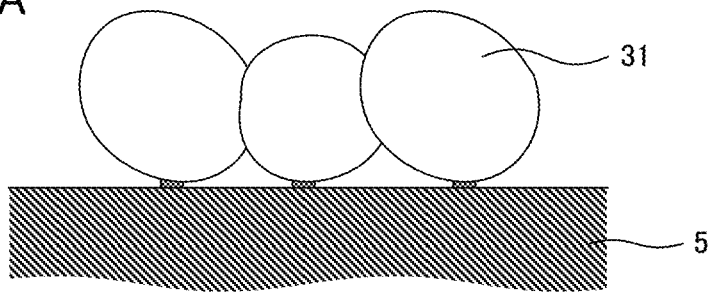
FIGS. 2A and 2B are schematic cross-sectional views explaining conventional deposition of a metal Li.
Figure 2B:
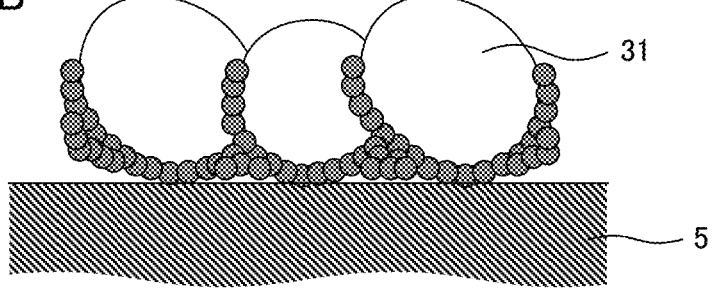

Here, FIGS. 2A and 2B are schematic cross-sectional views explaining conventional deposition of a metal Li. As shown in FIG. 2A, in the initial stage of charge, the point at which solid electrolyte 31 that is a Li ion conductive material contacts with anode current collector 5 that is an electron conductive material becomes a deposition origin of the metal Li. After that, the stress increases due to the deposited metal Li. As the result, the metal Li extends to the void among adjacent solid electrolytes. The metal Li has electron conductivity, so that the point at which the metal Li extended to the void contacts with solid electrolyte 31 becomes a new deposition origin of the metal Li. As the result, as shown in FIG. 2B, the metal Li extends to the cathode side along with the surface of solid electrolyte 31. In other words, the deposition direction of the metal Li becomes mainly toward the cathode; the minute short circuit easily occurs.

Figure 3A:
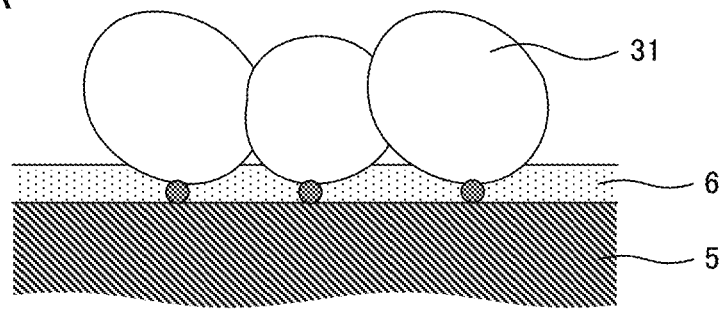
FIGS. 3A and 3B are schematic cross-sectional views explaining the deposition of a metal Li in the present disclosure.
Figure 3B:
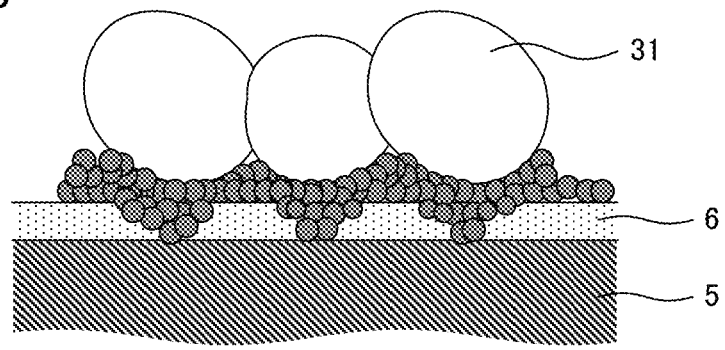

On the other hand, FIGS. 3A and 3B are schematic cross-sectional views explaining the deposition of a metal Li in the present disclosure. As shown in FIG. 3A, porous layer 6 is present between solid electrolyte 31 that is a Li ion conductive material, and anode current collector 5 that is an electron conductive material. The electric resistance of porous layer 6 is usually higher than that of anode current collector 5. Accordingly, the current is suppressed from concentrating at the deposition origin of the metal Li, and the activation of the deposition origin decreases. Also, porous layer 6 has a three dimensional structure, so that the deposition direction of the metal Li is not only toward the cathode, but dispersed to the other directions (such as the direction crosses the direction towards cathode). As the result, as shown in FIG. 3B, the metal Li is deposited uniformly in the interface of solid electrolyte 31 and porous layer 6; the minute short circuit does not easily occur.

Now, for example, the reversibility of the deposition and dissolution reaction of the metal Li may be degraded in some cases by just trying to inhibit the occurrence of the minute short circuit. For example, the thicker porous layer 6 becomes, the less the minute short circuit occurs. However, the inventors of the present application have found out a new problem that just trying to inhibit the occurrence of the minute short circuit facilitates the cut off of the Li ion conducting path during discharge (during dissolution of the metal Li), and as the result, the reversibility of the deposition and dissolution reaction of the metal Li is degraded (the dissolution reaction of the metal Li does not easily occur compared to the deposition reaction of the metal Li). Then, setting the electric resistance and the thickness of the porous layer in the specific range allowed the reversibility of the deposition and dissolution reaction of the metal Li to be improved while inhibiting the occurrence of short circuit.

The all solid state battery of the present disclosure is hereinafter described in each constitution.

1. Anode

The anode in the present disclosure comprises an anode current collector and a porous layer. Incidentally, the anode may further comprise an anode active material layer that is deposition Li, on the opposite side of the anode current collector, on the basis of the porous layer.

The electric resistance of the porous layer is usually 1Ω or more, and may be 4Ω or more. If the electric resistance of the porous layer is too small, there is a possibility that the current may not effectively be suppressed from concentrating at the deposition origin of the metal Li. Meanwhile, the electric resistance of the porous layer is usually 690Ω or less, may be 345Ω or less, may be 153Ω or less, and may be 115Ω or less. If the electric resistance of the porous layer is too large, there is a possibility that the reversibility of the deposition and dissolution reaction of the metal Li may be degraded. Incidentally, when the volume energy density of 800 Wh/L is hypothetically necessary for practical application, a design with the unit area capacity of 4.35 mAh/cm$^2$ is necessary. When the electric resistance is regarded as x [Ω], the current density is regarded as y [A], and the acceptable voltage change is regarded as 1 [V], the design should satisfy x×y≤1. If a vehicle having the range of 300 km is used at 100 km/h, the rate of C/3 (1.45 mA/cm$^2$) would be necessary, which would be x×1.45≤1 resulting in x≤690. In other words, the electric resistance of the porous layer is preferably 690Ω or less.

The thickness of the porous layer is usually 14 μm or less, and may be 11 μm or less. If the thickness of the porous layer is too large, there is a possibility that the reversibility of the deposition and dissolution reaction of the metal Li may be degraded. Also, from the viewpoint that the reversibility of the deposition and dissolution reaction of the metal Li is high, the thickness of the porous layer may be, for example, 4 μm or less. Meanwhile, the thickness of the porous layer is, for example, 0.5 μm or more, and may be 1 μm or more. If the thickness of the porous layer is too small, there is a possibility that the occurrence of short circuit may not be effectively inhibited.

The void of the porous layer is, for example, 5% or more, may be 15% or more, and may be 45% or more. Meanwhile, the void of the porous layer is less than 100%. Examples of the method for measuring the void may include a method to calculate from the apparent volume of the porous layer ($V_1$) and the true volume of the porous layer ($V_2$), as described in Examples later. In this case, the void of the porous layer may be calculated from ($V_1-V_2$)/$V_1$×100. Incidentally, for example, the void of the porous layer may be calculated by obtaining a plurality of cross-sectional images of the porous layer at various positions and the result of the image analysis thereof.

The porous layer comprises at least a resin. The porous layer may comprise just a resin, and may further comprise an additional material. Examples of the additional material may include an electron conductive material. Also, the porous layer preferably does not comprise an anode active material. Also, the porous layer may comprise just a resin and an electron conductive material. Incidentally, the electric resistance of the porous layer may be controlled by, for example, adjusting at least one of: the kind of the resin, the content of the resin, the kind of the electron conductive material, the content of the electron conductive material, the thickness of the porous layer, and the void of the porous layer.

Examples of the resin included in the porous layer may include a fluorine-based resin such as polyvinylidene fluoride (PVDF) and polytetra fluoroethylene (PTFE), and a rubber-based resin such as acrylate butadiene rubber (ABR) and styrene butadiene rubber (SBR). The fluorine-based resin has characteristics that chemical stability and insulating properties are high. There are no particular limitations on the content of the resin in the porous layer; for example, the content is 5 weight % or more, may be 15 weight % or more, and may be 25 weight % or more. The content of the resin in the porous layer may be 100 weight %, and may be less than 100 weight %.

Examples of the electron conductive material may include a carbon material and a metal material. Examples of the carbon material may include carbon black such as acetylene black (AB) and Ketjen black (KB); and a fiber-shaped carbon material such as vaper grown carbon fiber (VGCF), carbon nanotube (CNT), and carbon nanofiber (CNF). There are no particular limitations on the content of the electron conductive material in the porous layer; for example, the content is 5 weight % or more, and may be 10 weight % or more. The content of the electron conductive material in the porous layer is, for example, 95 weight % or less, and may be 85 weight % or less.

There are no particular limitations on the method for forming the porous layer. Examples thereof may include a method to paste a composition comprising at least a resin on the anode current collector. The composition may further contain an electron conductive material. Also, the composition may contain a solvent to dissolve the resin, or a dispersion medium to disperse the resin.

Meanwhile, examples of the materials for the anode current collector may include SUS (stainless steel), copper, nickel, and carbon. Also, examples of the shape of the anode current collector may include a foil shape. The thickness of the anode current collector is, for example, 0.1 μm or more, and may be 1 μm or more. If the thickness of the anode current collector is too small, there is a possibility that a current collecting function may be degraded. Meanwhile, the thickness of the anode current collector is, for example, 1 mm or less, and may be 100 μm or less. If the thickness of the anode current collector is too large, there is a possibility that the energy density of the all solid state battery may be degraded.

2. Solid Electrolyte Layer

The solid electrolyte layer in the present disclosure comprises at least a solid electrolyte. The solid electrolyte is preferably an inorganic solid electrolyte. Examples of the inorganic solid electrolyte may include a sulfide solid electrolyte, an oxide solid electrolyte, and a nitride solid electrolyte.

The sulfide solid electrolyte usually comprises a Li element and a S element. Further, the sulfide solid electrolyte preferably contains at least one kind of a P element, a Ge element, a Sn element, and a Si element. Also, the sulfide solid electrolyte may contain at least one kind of an O element and a halogen element (such as a F element, a Cl element, a Br element, and an I element).

Examples of the sulfide solid electrolyte may include $Li_2S$—$P_2S_5$, $Li_2S$—$P_2S_5$—$GeS_2$, $Li_2S$—$P_2S_5$—$SnS_2$, $Li_2S$—$P_2S_5$—$SiS_2$, $Li_2S$—$P_2S_5$—LiI, $Li_2S$—$P_2S_5$—LiI—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m and n is a positive number; Z is one of Ge, Zn, and Ga), $Li_2S$—$GeS_2$, $Li_2S$—$SiS_2$—$Li_3PO_4$, $Li_2S$—$SiS_2$—$Li_xMO_y$ (provided that x and y is a positive number; M is one of P, Si, Ge, B, Al, Ga, and In). Incidentally, the description of "$Li_2S$—$P_2S_5$" above refers to a material comprising a raw material composition including $Li_2S$ and $P_2S_5$, and the likewise applies to the other descriptions.

The solid electrolyte may be glass, may be glass ceramic, and may be a crystalline material. The glass may be obtained by an amorphizing treatment for a raw material composition (such as a mixture of $Li_2S$ and $P_2S_5$). Examples of the amorphizing treatment may include mechanical milling. The mechanical milling may be dry mechanical milling and may be wet mechanical milling, but the latter is preferable. The reason therefor is to prevent the raw material composition from adhering to the wall surface of a container. Also, the glass ceramic may be obtained by a heating treatment for glass. Also, the crystalline material may be obtained by, for example, a solid phase reaction treatment to a raw material composition.

The shape of the solid electrolyte is preferably a granular shape. Also, the average particle size ($D_{50}$) of the solid electrolyte is, for example, 0.01 μm or more. Meanwhile, the average particle size ($D_{50}$) of the solid electrolyte is, for example, 10 μm or less, and may be 5 μm or less. The Li ion conductivity of the solid electrolyte at 25° C. is, for example, $1 \times 10^{-4}$ S/cm or more, and is preferably $1 \times 10^{-3}$ S/cm or more.

The content of the solid electrolyte in the solid electrolyte layer is, for example, 70 weight % or more, and may be 90 weight % or more. The solid electrolyte layer may contain a binder as required. As the binder, the resin described in "1. Anode" above may be exemplified. Also, the thickness of the solid electrolyte layer is, for example, 0.1 μm or more. Meanwhile, the thickness of the solid electrolyte layer is, for example, 300 μm or less, and may be 100 μm or less.

3. Cathode

The cathode in the present disclosure comprises a cathode current collector and a cathode active material layer. The cathode active material layer comprises at least a cathode active material, and may contain at least one of a solid electrolyte, a conductive material, and a binder, as required.

There are no particular limitations on the cathode active material, and examples thereof may include an oxide active material, and a sulfur-based active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$, and $Li(Ni_{0.5}Mn_{1.5})O_4$; and an olivine type active material such as $LiFePO_4$, $LiMnPO_4$, $LiNiPO_4$, and $LiCoPO_4$. Also, as the oxide active material, a material such as a LiMn spinel active material represented by $Li_{1+x}Mn_{2-x-y}M_yO_4$ (M is at least one kind of Al, Mg, Co, Fe, Ni, and Zn; $0<x+y<2$) and a lithium titanate may be used.

Also, a coating layer including a Li ion conductive oxide may be formed on the surface of the oxide active material. The reason therefor is to inhibit the reaction of the oxide active material with the solid electrolyte. Examples of the Li ion conductive oxide may include $LiNbO_3$, $Li_4Ti_5O_{12}$, and $Li_3PO_4$. The thickness of the coating layer is, for example, 0.1 nm or more, and may be 1 nm or more. Meanwhile, the thickness of the coating layer is, for example, 100 nm or less, and may be 20 nm or less. The coverage of the coating layer on the surface of the oxide active material is, for example, 70% or more, and may be 90% or more.

Also, the sulfur-based active material is an active material including at least a S element. The sulfur-based active material may or may not contain a Li element. Examples of the sulfur-based active material may include a simple substance of sulfur, lithium sulfide ($Li_2S$), and polysulfide lithium ($Li_2S_x$, $2 \leq x \leq 8$).

As the solid electrolyte, the solid electrolyte described in "2. Solid electrolyte layer" above may be exemplified. As the conductive material and the binder, respectively, the electron conductive material and the resin described in "1. Anode" above may be exemplified. Also, the thickness of the cathode active material layer is, for example, 0.1 μm or more. Meanwhile, the thickness of the cathode active material layer is, for example, 300 μm or less, and may be 100 μm or less.

Meanwhile, examples of the material for the cathode current collector may include SUS, aluminum, nickel, iron, titanium, and carbon. Also, examples of the shape of the cathode current collector may include a foil shape. The thickness of the cathode current collector is, for example, 0.1 μm or more, and may be 1 μm or more. Meanwhile, the thickness of the cathode current collector is, for example, 1 mm or less, and may be 100 μm or less.

4. All Solid State Battery

The all solid state battery of the present disclosure comprises an anode current collector, a porous layer, a solid electrolyte layer, a cathode active material layer, and a cathode current collector, in this order. As shown in FIG. 1A, an anode active material layer may not be present between solid electrolyte layer 3 and porous layer 6. In particular, it is preferable that solid electrolyte layer 3 directly contacts with porous layer 6. Meanwhile, as shown in FIG. 1B, all solid state battery 10 may comprise anode active material layer 2 that is a deposition Li between solid electrolyte layer 3 and porous layer 6.

The all solid state battery of the present disclosure comprises the porous layer, and thus a dense deposition Li layer (anode active material layer) may be formed after charge. The void in the deposition Li layer is, for example, 10% or less, and may be 5% or less. Meanwhile, the void in the deposition Li layer may be, 0%, and may be larger than 0%. For example, when a Li foil is used as the anode active material, the void of the Li foil is usually 0%; however, there are some cases a void is slightly generated in the deposition Li layer. Incidentally, the void of the deposition Li layer may be confirmed by observing the cross-sectional image of the deposition Li layer.

The all solid state battery of the present disclosure is usually a secondary battery and useful as a car-mounted battery for example. The secondary battery includes the usage of the secondary battery as a primary battery (usage for the purpose just to discharge once after charge). Examples of the shape of the all solid state battery may include a coin shape, a laminate shape, a cylindrical shape, and a square shape. Also, the all solid state battery of the present disclosure comprises the porous layer, and thus the occurrence of short circuit may be inhibited even if charged at a high rate. Accordingly, in the present disclosure, a charge method for charging a battery at the rate of 1 C or more using the above described all solid state battery may also be provided.

B. Anode

Figure 4:
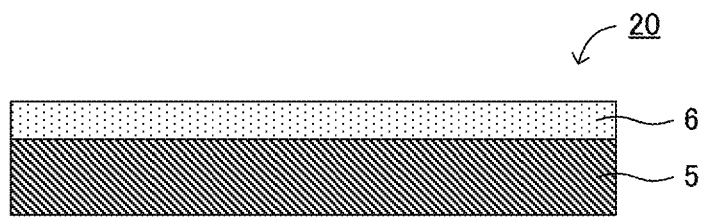
FIG. 4 is a schematic cross-sectional view illustrating an example of the anode of the present disclosure.

FIG. 4 is a schematic cross-sectional view illustrating an example of the anode of the present disclosure. Anode 20 shown in FIG. 4 is an anode to be used in an all solid state battery utilizing a deposition and dissolution reaction of a metal Li as an anode reaction, and the anode comprises anode current collector 5 and porous layer 6 comprising a resin in this order.

According to the present disclosure, arrangement of a specific porous layer allows an anode to have high reversibility of deposition and dissolution reaction of a metal Li while inhibiting an occurrence of short circuit. The details of the anode of the present disclosure are in the same contents as those described in "A. All solid state battery" above; thus, the descriptions herein are omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation thereto.

EXAMPLES

Example 1-1

Ketjen black (KB) was prepared as the electron conductive material, and polyvinylidene fluoride (PVDF) was prepared as the resin. Next, KB and PVDF were mixed in the weight ratio of KB:PVDF=75:25, and the mixture was pasted on an anode current collector (Cu foil) to form a porous layer having thickness of 3 μm.

Next, a sulfide solid electrolyte ($Li_2$—$P_2S_5$-based material including LiBr and LiI) of 101.7 mg was prepared. After that, the sulfide solid electrolyte was arranged on the surface of the porous layer and pressed at the pressure of 1 ton/cm² to form a solid electrolyte layer having thickness of 500 μm. Next, prepared was a cathode mixture including a cathode active material ($LiNi_{1/3}Co_{1/3}Mn_{1/3}O_2$) of 26.7 mg, a sulfide solid electrolyte ($Li_2$—$P_2S_5$-based material including LiBr and LiI) of 4.2 mg, and a conductive material (VGCF) of 0.4 mg. After that, the cathode mixture was arranged on the surface of the solid electrolyte layer and pressed at the pressure of 6 ton/cm² to form a cathode active material layer having thickness of 82.6 μm. An evaluation cell was obtained in this manner. Incidentally, the evaluation cell was fabricated under an argon atmosphere.

Example 1-2

An evaluation cell was obtained in the same manner as in Example 1-1 except that the thickness of the porous layer was changed to 5 μm.

Example 1-3

An evaluation cell was obtained in the same manner as in Example 1-1 except that the thickness of the porous layer was changed to 11 μm.

Example 2

An evaluation cell was obtained in the same manner as in Example 1-1 except that the resin content in the porous layer was changed to 50 weight % and the thickness of the porous layer was changed to 2 μm.

Example 3-1

An evaluation cell was obtained in the same manner as in Example 1-1 except that the resin content in the porous layer was changed to 89 weight %.

Example 3-2

An evaluation cell was obtained in the same manner as in Example 3-1 except that the thickness of the porous layer was changed to 9 μm.

Example 3-3

An evaluation cell was obtained in the same manner as in Example 3-1 except that the thickness of the porous layer was changed to 14 μm.

Example 4-1

An evaluation cell was obtained in the same manner as in Example 1-1 except that the resin content in the porous layer was changed to 95 weight % and the thickness of the porous layer was changed to 2 μm.

Example 4-2

An evaluation cell was obtained in the same manner as in Example 4-1 except that the thickness of the porous layer was changed to 5 μm.

Example 4-3

An evaluation cell was obtained in the same manner as in Example 4-1 except that the thickness of the porous layer was changed to 9 μm.

Example 5

An evaluation cell was obtained in the same manner as in Example 1-1 except that the electron conductive material was not used and the thickness of the porous layer was changed to 1 μm.

Comparative Example 1

An evaluation cell was obtained in the same manner as in Example 1-1 except that the resin content in the porous layer was changed to 15 weight % and the thickness of the porous layer was changed to 22 μm.

Comparative Example 2

An evaluation cell was obtained in the same manner as in Comparative Example 1 except that the thickness of the porous layer was changed to 2 μm.

Comparative Example 3

An evaluation cell was obtained in the same manner as in Example 1-1 except that the electron conductive material was not used and the thickness of the porous layer was changed to 4 μm.

Reference Example 1

An evaluation cell was obtained in the same manner as in Example 1-1 except that a SUS foil was used as the anode current collector and the porous layer was not arranged.

[Evaluation]
Electric Resistance Measurement

An electric resistance measurement was conducted for the porous layer in Examples 1-1 to 5 and Comparative Examples 1 to 3. In specific, a stacked body having an anode current collector (Cu foil) and the porous layer was pinched with a SUS pin and confined in the pressure of 0.2 N to fabricate a sample, and the electric resistance thereof was measured.

The electric resistance of the porous layer in Examples 1-1, 1-3, Example 2, Examples 3-1, 3-3, Examples 4-1, 4-3, Comparative Example 1, and Comparative Example 2 was respectively measured in the following conditions. First, as a blank test, an anode current collector (Cu foil) was used as just a sample, current of 100 μA was applied thereto for 1 minute, and 10 seconds pause was taken. After that, current of −100 μA was applied thereto for 1 minute, and 10 seconds pause was taken. The test was repeated in the current value respectively changed to ±200 μA, ±400 μA, and ±1000 μA. After that, in the plot graph of current (X) and voltage (y), the incline calculated by the least squares method was used as the electric resistance of the blank. Next, the electric resistance of the stacked body was measured in the same conditions as in the blank test. The electric resistance of the blank was subtracted from the electric resistance of the stacked body, and the result was used as the electric resistance of the porous layer.

On the other hand, the electric resistance of the porous layer in Example 5 and Comparative Example 3 was respectively measured in the following conditions. First, as a blank test, an anode current collector (Cu foil) was used as just a sample, current of 10 μA was applied thereto for 1 minute, and 1 minute pause was taken. After that, current of −10 μA was applied thereto for 1 minute, and 1 minute pause was taken. The test was repeated in the current value respectively changed to ±20 μA and ±40 μA. After that, in the plot graph of current (X) and voltage (y), the incline calculated by the least squares method was used as the electric resistance of the blank. Next, the electric resistance of the stacked body was measured in the same conditions as in the blank test. The electric resistance of the blank was subtracted from the electric resistance of the stacked body, and the result was used as the electric resistance of the porous layer.

The results of the electric resistance measurement are shown in Table 1. Incidentally, the electric resistance in Example 1-2 was not measured; however, it is suggested that the electric resistance thereof would be the value in the middle of the electric resistance of Example 1-1 and Example 1-3. Example 3-2 and Example 4-2 are likewise.

Void Measurement

A void measurement was conducted for the porous layer in Examples 1-1 to 5 and Comparative Examples 1 to 3. First, the thickness and the weight of the porous layer were measured. Next, an apparent volume ($V_1$) was calculated from the thickness of the porous layer×the area of the porous layer (1 cm²). Next, the weight of each material was calculated from the weight of the porous layer×the mass ratio of each material. Next, the true volume of each material was calculated from the weight of each material/true density of each material. Next, the true volumes of each material were summed to calculate the true volume of the porous layer ($V_2$). Next, the void of the porous layer (%) was calculated from $(V_1-V_2)/V_1 \times 100$. The results are shown in Table 1.

Charge and Discharge Test

A charge and discharge test was conducted for the evaluation cells obtained in Examples 1-1 to 5, Comparative Examples 1 to 3, and Reference Example 1. First, the evaluation cell was placed still in a thermostatic tank at 60° C. for 3 hours to uniform the temperature of the cell. Next, the charge of the evaluation cell was started from constant current of 8.7 mA/cm² current density (equivalent to 2 C), and stopped when the charge capacity reached to 4.35 mAh/cm². After 10 minutes, the discharge of the evaluation cell was started from constant current of 0.435 mAh/cm² current density (equivalent to 0.1 C) and stopped when the voltage reached to 3.0 V. Thereby, OCV after charge and the discharge capacity were measured. The results are shown in Table 1.

Incidentally, by the OCV after charge, the influence of minute short circuit may be evaluated. As for $LiNi_{1/3}Co_{1/3}Mn_{1/3}O_2$ used as the cathode active material, the higher SOC (state of charge) becomes, the higher the OCP becomes. On the other hand, the OCP of the metal Li is at a certain level regardless of the deposition amount. Accordingly, high OCV means that the battery is charged to higher SOC even though the charge capacity is at a certain level. In other words, the more the minute short circuit occurs, the larger the loss during charge becomes, and the smaller OCV after charge becomes. In contrast, the less the minute short circuit occurs, the smaller the loss during charge becomes, and the OCV after charge becomes large. In Table 1, the case of the OCV after charge being 4.12 or more is regarded as A, and being 4.10 or less is regarded as B. Also, by the discharge capacity, the reversibility of the deposition and dissolution reaction of the metal Li may be evaluated. The higher the reversibility is, the larger the discharge capacity becomes. The lower the reversibility is, the smaller the discharge capacity becomes. In Table 1, the case the discharge capacity being 3.00 mAh or more is regarded as A, being 2.00 mAh or more and less than 3.00 mAh is regarded as B, and being less than 2.00 mAh is regarded as C.

A Cu foil was used as the anode current collector in each Example, and a SUS foil was used as the anode current collector in Reference Example 1; thus they cannot be directly compared to each other, but it was suggested that the arrangement of the porous layer allowed the OCV after charge to become large and short circuit to be inhibited.

On the other hand, it was effective to increase the thickness of the porous layer if trying to just inhibit short circuit as in Comparative Example 1. In fact, the OCV after charge in Comparative Example 1 was in the same level as in each Example. However, in Comparative Example 1, since the thickness of the porous layer was too large, the dissolution reaction of the metal Li during discharge did not easily proceed and resulted in small discharge capacity. On the other hand, in each Example, since the thickness of the porous layer was small, the dissolution reaction of the metal Li during discharge easily proceeded and resulted in large discharge capacity. Also, for example, when comparing Examples 1-1, 1-2, and 1-3, there was a tendency that the larger the thickness of the porous layer was, the smaller the discharge capacity became. This tendency was the same for the other Examples. The reason therefor was presumed that, as described above, the larger the thickness of the porous layer was, the less easily the dissolution reaction of the metal Li during discharge proceeded.

Also, for example, when comparing Example 1-1 to Comparative Example 2, it was confirmed that the OCV after charge became small (which was in the state easily causes short circuit) if the electric resistance of the porous layer was too small. In other words, it was suggested that adequately large electric resistance inhibited the current from concentrating at the deposition origin of the metal Li, which resulted in uniform deposition of the metal Li in the interface between the solid electrolyte layer and the porous

TABLE 1

| | Porous layer | | | | OCV after charge | | Discharge capacity | |
|---|---|---|---|---|---|---|---|---|
| | Resin content [wt %] | Thickness [μm] | Void [%] | Electric resistance [Ω] | [V] | Eval. | [mAh] | Eval. |
| Example 1-1 | 25 | 3 | 74.4 | 1.01 | 4.28 | A | 4.12 | A |
| Example 1-2 | 25 | 5 | 94.9 | — | 4.23 | A | 3.91 | A |
| Example 1-3 | 25 | 11 | 88.4 | 4.64 | 4.12 | A | 3.15 | A |
| Example 2 | 50 | 2 | 60.7 | 4.93 | 4.15 | A | 3.47 | A |
| Example 3-1 | 89 | 3 | 54.7 | 54.31 | 4.15 | A | 3.31 | A |
| Example 3-2 | 89 | 9 | 66.8 | — | 4.18 | A | 3.16 | A |
| Example 3-3 | 89 | 14 | 74.7 | 114.50 | 4.3 | A | 3.02 | A |
| Example 4-1 | 95 | 2 | 65.3 | 39.05 | 4.29 | A | 3.98 | A |
| Example 4-2 | 95 | 5 | 61.7 | — | 4.25 | A | 3.61 | A |
| Example 4-3 | 95 | 9 | 48.3 | 90.83 | 4.22 | A | 3.21 | A |
| Example 5 | 100 | 1 | 17.6 | 152.98 | 4.28 | A | 3.52 | A |
| Comparative Example 1 | 15 | 22 | 89.6 | 3.11 | 4.23 | A | 2.70 | B |
| Comparative Example 2 | 15 | 2 | 61.9 | 0.48 | 3.88 | B | 1.70 | C |
| Comparative Example 3 | 100 | 4 | 10.7 | 13452.13 | 3.89 | B | 1.58 | C |
| Reference Example 1 | | | | | 3.98 | B | 1.70 | C |

As shown in Table 1, when the thickness and the electric resistance of the porous layer were in the specific range, the results of the OCV after charge and the discharge capacity were excellent. In other words, it was confirmed that the reversibility of the deposition and dissolution reaction of the metal Li was improved while inhibiting the occurrence of short circuit (especially minute short circuit).

layer. Also, when comparing Example 5 to Comparative Example 3, it was confirmed that too large electric resistance of the porous layer brought into small discharge capacity in particular. The reason the discharge capacity became small was presumed that too large electric resistance of the porous layer did not facilitate electrons to conduct to the porous layer.

Cross-Section Observation

Figure 5A:
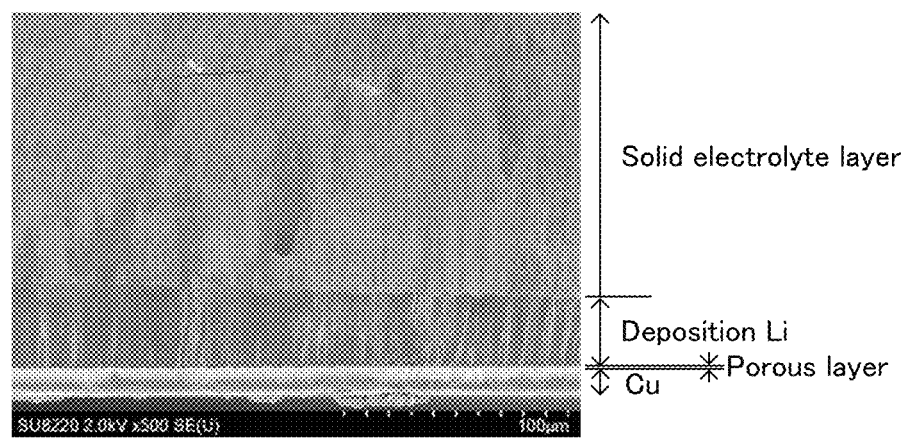
FIGS. 5A and 5B are cross-sectional images of the evaluation cell (after charge) obtained in Example 4-1.
Figure 5B:
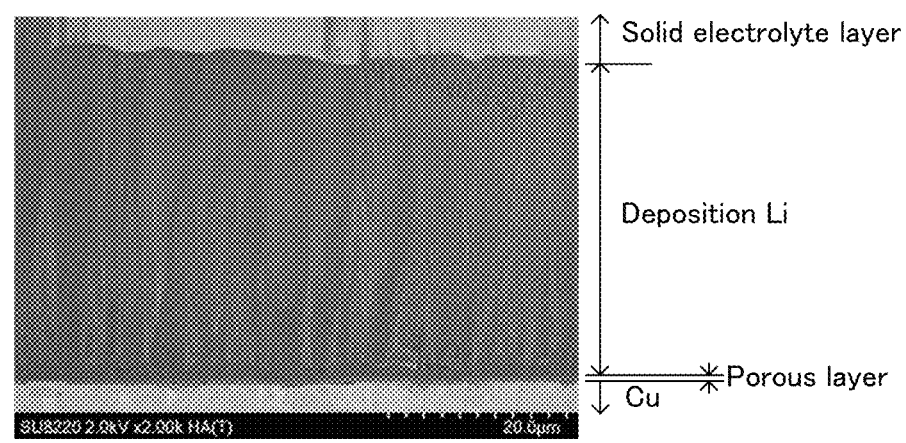

The cross-section of the evaluation cell (after charge) obtained in Example 4-1 was observed by SEM-EDX (Scanning Electron Microscope-Energy Dispersive X-ray Spectroscopy). The result is shown in FIGS. 5A and 5B. Incidentally, FIG. 5B is an enlarged view of a part of FIG. 5A. As shown in FIGS. 5A and 5B, in Example 4-1, the thickness of the Li deposited between the solid electrolyte layer and the porous layer was uniform. In particular, as shown in FIG. 5B, it was confirmed that the deposition Li formed a dense layer although it partially included sparse part. In this manner, in the present disclosure, it was confirmed that arrangement of the specific porous layer allowed the uniform deposition of the metal Li in the interface between the solid electrolyte layer and the porous layer.

Figure 6:
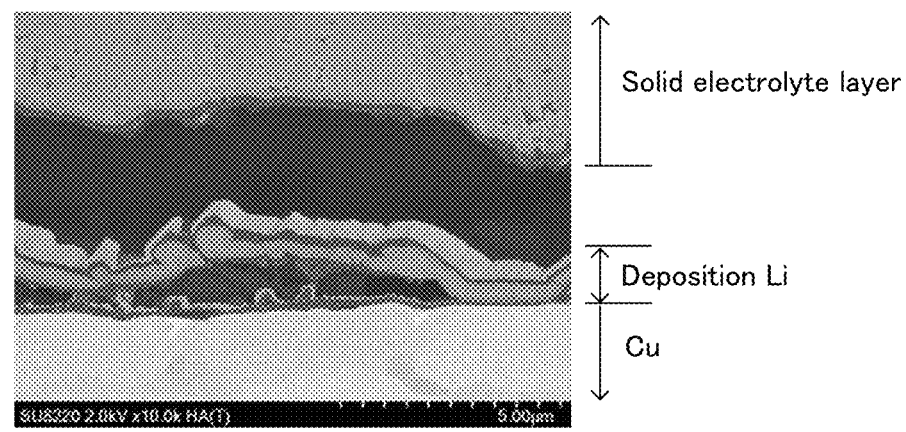
FIG. 6 is a cross-sectional image of the evaluation cell (after charge) without the arrangement of the porous layer.

On the other hand, FIG. 6 is a cross-sectional image of the evaluation cell (after charge) without arranging the porous layer. In FIG. 6, the thickness of the Li deposited between the solid electrolyte layer and the anode current collector was ununiform. Further, it was confirmed that the deposition Li formed a layer that was sparse on the whole. Incidentally, in FIG. 6, there is a space between the solid electrolyte layer and the deposition Li, but it can be known that the surface, that is the deposition Li side, of the solid electrolyte layer and the surface, that is the solid electrolyte layer side, of the deposition Li are in corresponding shapes.

REFERENCE SIGNS LIST

1 ... cathode active material layer
2 ... anode active material layer
3 ... solid electrolyte layer
4 ... cathode current collector
5 ... anode current collector
6 ... porous layer
10 ... all solid state battery
20 ... anode

What is claimed is:

1. An all solid state battery utilizing a deposition and dissolution reaction of a metal Li as an anode reaction, the all solid state battery comprising:
   an anode current collector, a porous layer comprising a resin, a solid electrolyte layer, a cathode active material layer, and a cathode current collector, in this order;
wherein
   an electric resistance of the porous layer is 1Ω or more and 690Ω or less;
   a thickness of the porous layer is 14 μm or less,
   the solid electrolyte layer directly contacts the porous layer;
   the porous layer optionally contains an electron conductive material, and
   a content of the electron conductive material in the porous layer is 0 weight % or more and 11 weight % or less.

2. The all solid state battery according to claim 1, wherein the resin is a fluorine-based resin.

3. The all solid state battery according to claim 2, wherein the fluorine-based resin is polyvinylidene fluoride (PVDF).

4. The all solid state battery according to claim 1, wherein a content of the resin in the porous layer is 25 weight % or more; and
   the thickness of the porous layer is 4 μm or less.

5. The all solid state battery according to claim 1, wherein the electric resistance of the porous layer is 153Ω or less.

6. The all solid state battery according to claim 1, wherein the porous layer contains an electron conductive material.

7. The all solid state battery according to claim 1, wherein the porous layer contains just the resin.

8. An anode to be used in an all solid state battery utilizing a deposition and dissolution reaction of a metal Li as an anode reaction, the anode comprising:
   an anode current collector and a porous layer comprising a resin in this order;
wherein
   an electric resistance of the porous layer is 1Ω or more and 690Ω or less; and
   a thickness of the porous layer is 14 μm or less,
   the void of the porous layer is 15% or more;
   the porous layer optionally contains an electron conductive material, and
   a content of the electron conductive material in the porous layer is 0 weight % or more and 11 weight % or less.

9. The all solid state battery according to claim 1, wherein the void of the porous layer is 15% or more.

10. An all solid state battery utilizing a deposition and dissolution reaction of a metal Li as an anode reaction, the all solid state battery comprising the anode to be used in an all solid state battery according to claim 8,
   wherein the all solid state battery contains the anode current collector, the porous layer comprising a resin, a solid electrolyte layer, a cathode active material layer, and a cathode current collector, in this order.

11. The all solid state battery according to claim 10, wherein the void of the porous layer is 45% or more and less than 100%.

12. The all solid state battery according to claim 10, wherein the thickness of the porous layer is 1 μm or more and 11 μm or less.

13. The all solid state battery according to claim 10, wherein the electric resistance of the porous layer is 1Ω or more and 345Ω or less.

14. The all solid state battery according to claim 10, wherein the electric resistance of the porous layer is 1Ω or more and 153Ω or less.

15. The all solid state battery according to claim 10, wherein the electric resistance of the porous layer is 1Ω or more and 115Ω or less.

16. The all solid state battery according to claim 10, wherein the all solid state battery further comprises an anode active material layer that is a deposition Li between the solid electrolyte layer and the porous layer, and the void in the anode active material layer that is a deposition Li is larger than 0% and 5% or less.

* * * * *